Patented June 4, 1929.

1,716,098

UNITED STATES PATENT OFFICE.

HAROLD E. WOODWARD, OF PENNS GROVE, NEW JERSEY, ASSIGNOR TO E. I. DU PONT DE NEMOURS & COMPANY, OF WILMINGTON, DELAWARE, A CORPORATION OF DELAWARE.

TRISAZO DYE AND PROCESS OF PRODUCING THE SAME.

No Drawing.    Application filed March 2, 1928. Serial No. 258,687.

This invention relates to new violet trisazo dyes which may be diazotized and developed on the fibre. More specifically it relates to trisazo dyes which may be prepared by diazotizing the amino azo compound prepared from an aromatic amino-sulphonic acid and an aromatic amine or an amino ether, to which amine or ether coupling can take place in the position para to the amino group, coupling the resulting diazo azo compound to para-amino - benzoyl - 2 - amino - 5 - naphthol - 7 - sulphonic acid, diazotizing the resulting disazo compound and coupling with J-acid (2-amino-5-naphthol-7-sulphonic acid).

The new dyes may be represented by the general formula:

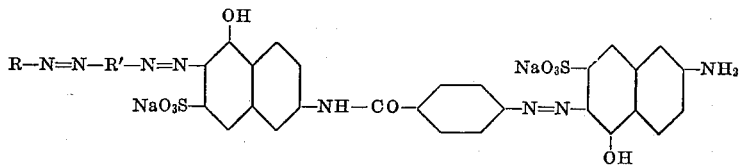

in which R is a radical of an aromatic amino-sulphonic acid and R' is a radical of an aromatic amine or amino ether, in which coupling can take place in the position para to the amino group.

In order to set forth in greater detail the method of preparing the new dyes, examples of specific adaptations of the invention are furnished below but it is to be understood that these examples are presented merely for illustrative purposes and that the invention is by no means confined to the particular reagents and conditions exemplified.

*Example 1.*

The amino azo compound prepared from 17.3 parts of metanilic acid and 14.3 parts of alpha-naphthylamine is dissolved as the sodium salt in 1000 parts of water. 150 parts of salt and 7.0 parts of sodium nitrite are added. Then 36 parts of 30% hydrochloric acid is added and the charge is stirred for three hours at 15-20° C. It is then run into a solution of 37.5 parts of para-amino-benzoyl-2-amino-5-naphthol-7-sulphonic acid and 42 parts of sodium carbonate dissolved in 500 parts of water and cooled to 0° C. After stirring one-half hour the mixture is heated to 75° C. and salted out with about 200 parts of salt. The disazo combination is filtered off and redissolved in 1200 parts of water. After cooling to 10° C. it is acidified with 48 parts of 30% hydrochloric acid and diazotized with 7.0 parts of sodium nitrite. This diazo compound is then run into a solution of 25 parts of J-acid (2-amino-5-naphthol-7-sulphonic acid) and 60 parts of sodium carbonate in 500 parts of water at 10° C. After stirring one-half hour the mixture is heated to 75° C. and salted out with about 250 parts of salt. It is then filtered and dried. In the form of its sodium salt it may be represented by the formula:

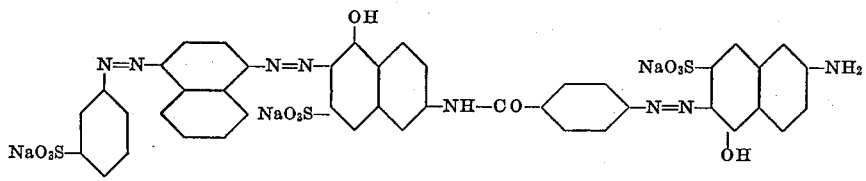

This product is in the form of a dark blue powder, soluble in water with a dark violet color. Its solution in concentrated sulphuric acid is a violet-black color, and on dilution with water it gives a violet-black precipitate. The color dyes cotton a reddish-violet color which, after being diazotized and developed with beta-naphthol, becomes bluer and brighter, giving a blue-violet color which is fast to washing and to light.

*Example 2.*

By a procedure similar to that given in the first example, a color is made from meta- 4-xylidine-5-sulphonic acid, para-xylidine, para-amino-benzoyl-2-amino-5-naphthol-7-sulphonic acid and 2-amino-5-naphthol-7-sulphonic acid. This dye is obtained as a greenish-black powder, soluble in water with a red color and in concentrated sulphuric acid with a blue color, which gives a red solution on dilution. When this color is dyed on cotton and developed in the usual manner with beta-naphthol, it gives a red-violet color fast to light and washing. The dye formed after diazotization and development on the fiber with beta-naphthol may be represented by the formula:—

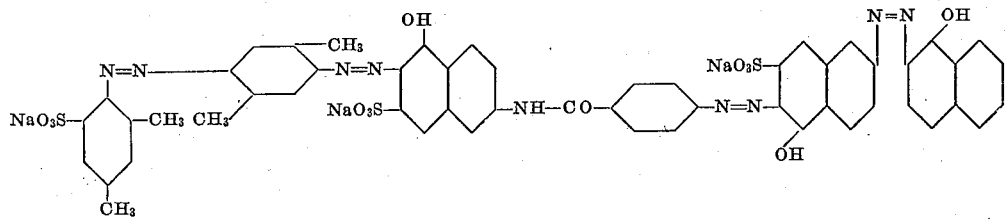

In place of the first components employed in the examples other amino sulphonic acids of the benzene or naphthalene series may be substituted. For example, para-toluidine-meta-sulphonic acid, 2-chlor-5-toluidine-4-sulphonic acid and 2-naphthylamine-4:8-disulphonic acid have been satisfactorily employed. Also, in place of the particular second component named in the examples other amines or amino ethers of the benzene or naphthalene series may be employed, provided the amino group will be para to the azo group after coupling. For example, meta-toluidine, ortho-anisidine, 3-amino-4-cresol-methyl-ether and 1-naphthylamine-6- or 7-sulphonic acid may be substituted for the second components named in the examples. By varying the intermediates within the scope of the appended claims, a large number of valuable trisazo dyes, suitable for dyeing cotton, rayon or silk, and of excellent fastness to light and washing, may be prepared.

I claim:

1. New azo dyes of the type:

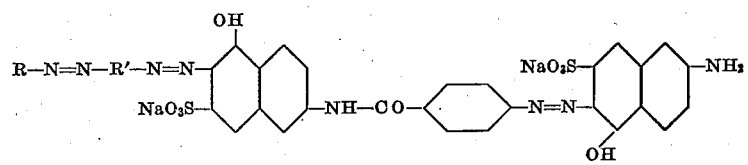

which after being developed are of the following constitution:

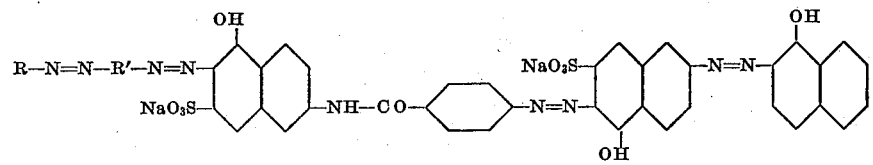

in which R is an aromatic amino-sulphonic acid radical and R' is the radical of an aromatic amine or amino ether in which the azo groups are para to each other.

2. New azo dyes of the type:

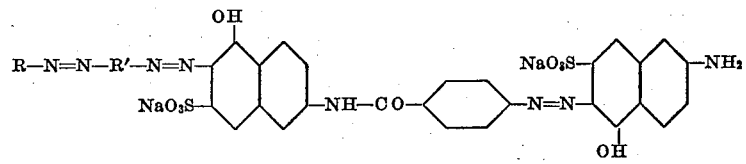

in which R is the radical of a compound of the group consisting of metanilic acid, para-toluidine-meta-sulphonic acid, meta-4-xylidine-5-sulphonic acid, 2-chlor-5-toluidine-4-sulphonic acid, and 2-naphthylamine-4:8-disulphonic acid and R' is the radical of a compound of the group consisting of meta-toluidine, para-xylidine, alpha-naphthylamine, ortho-anisidine, 3-amino-4-cresol-methyl-ether, and 1-naphthylamine-6- or 7-sulphonic acid.

3. The new dye:

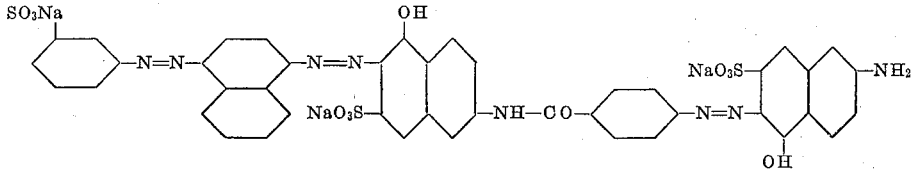

which when dyed on cotton, diazotized and developed with beta-naphthol gives a bluish-violet shade.

4. Textile material dyed with a compound of the type set forth in claim 1.

In testimony whereof, I affix my signature.

HAROLD E. WOODWARD.